Patented Dec. 6, 1949

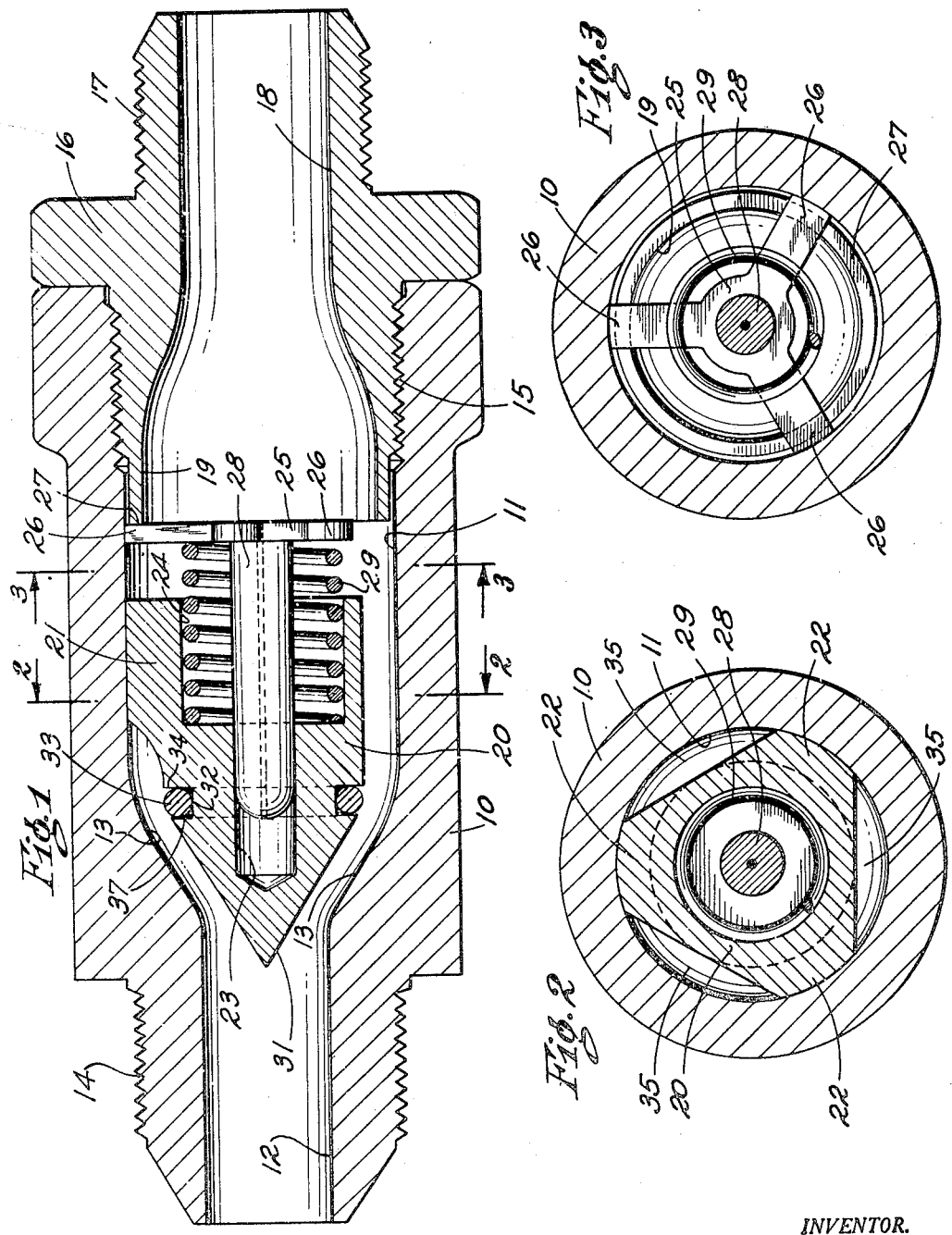

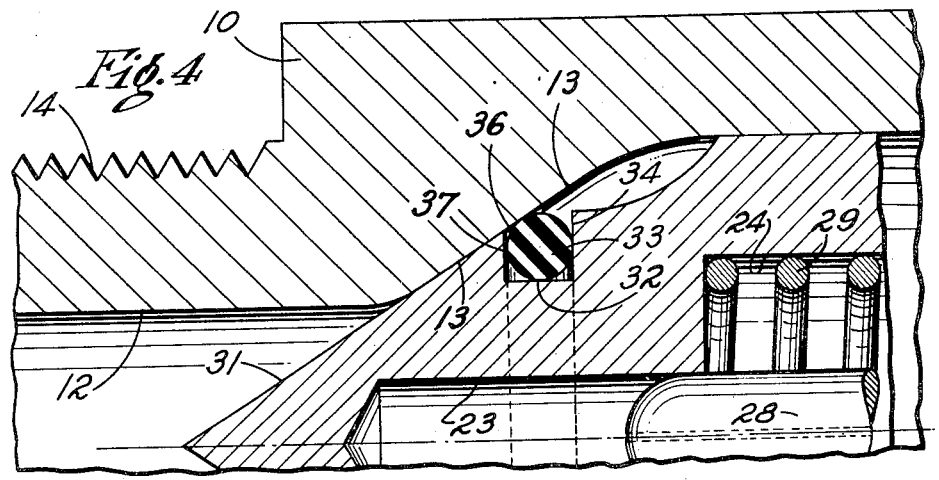
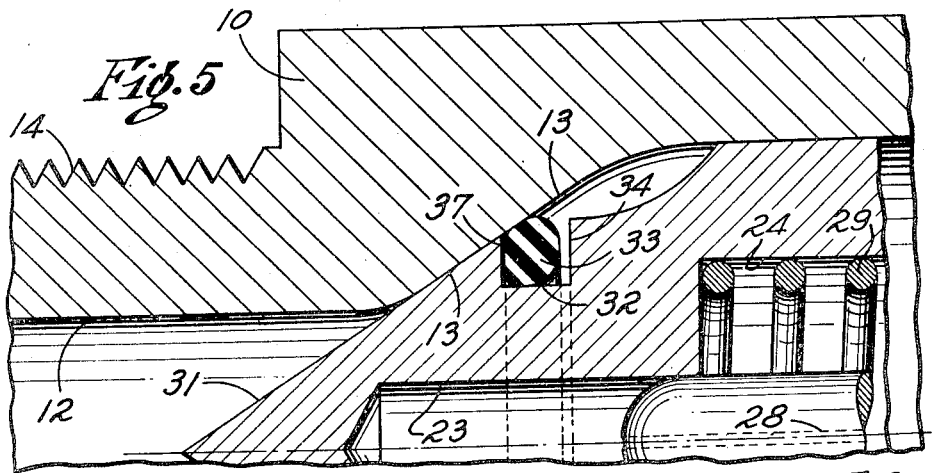
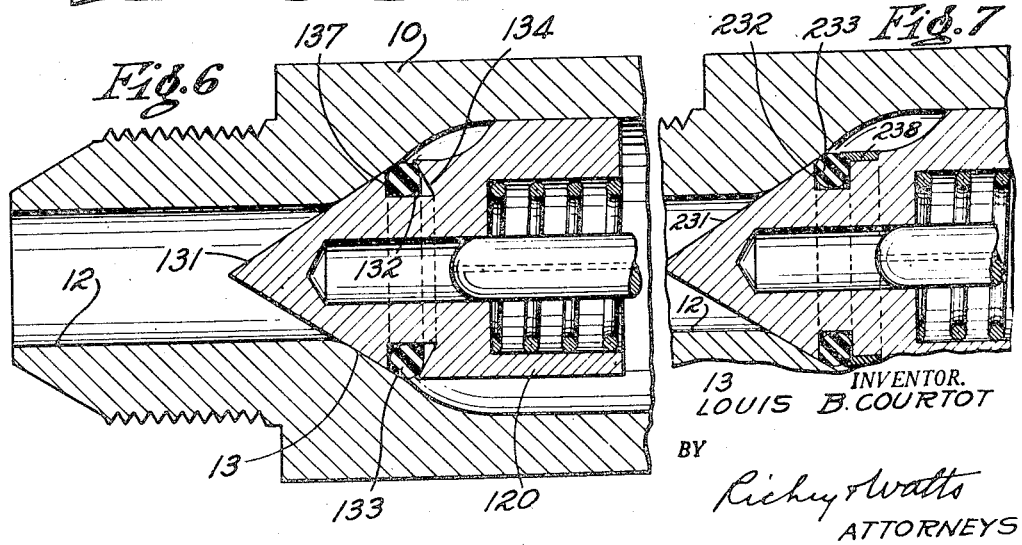

2,490,511

UNITED STATES PATENT OFFICE 2,490,511

VALVE SEAL

Louis B. Courtot, Cleveland, Ohio, assignor to The Weatherhead Company, Cleveland, Ohio, a corporation of Ohio Application October 27, 1944, Serial No. 560,688

2 Claims. (Cl. 251—144)

This invention relates to valves, and particularly to seals for needle check valves and the like.

The principal objects of this invention are to eliminate the necessity of accurate grinding or lapping of the valve member and seat of a valve of this type; to obtain a tight, leak-proof closure of the valve; to seal the valve when closed with a deformable member while at the same time providing a valve closure capable of withstanding pressures greatly in excess of the pressure required to deform the deformable member; to arrange a deformable sealing member for a valve of this type so that it cannot be pinched or caught between relatively movable rigid parts of the valve either as the result of the opening and closing movements of the valve or the fluid pressure to which the valve is subjected; to minimize chattering of a valve of this type; and to increase the durability and life of the valve seal. Other objects and advantages of the present invention will appear hereinafter.

In the accompanying drawings:

Fig. 1 is a longitudinal section through a needle check valve embodying this invention; the needle being shown in partially opened position;

Fig. 2 is a section on the line 2—2 of Fig. 1;

Fig. 3 is a section on the line 3—3 of Fig. 1;

Fig. 4 is a fragmentary longitudinal section through the valve shown in Fig. 1 showing the parts when the needle first engages its seat during closing;

Fig. 5 is a view similar to Fig. 4 showing the valve in fully closed and sealed position;

Fig. 6 is a fragmentary longitudinal section of a modified form of valve showing the parts when the needle has first contacted its seat in closing; and Fig. 7 is a similar view of a further modification.

Referring to the drawings, the valve illustrated in Figs. 1 to 5 inclusive includes a casing 10 having a main valve bore 11 joined to a reduced inlet bore 12 by a substantially conical seat 13. The casing is preferably reduced and externally threaded as indicated at 14 at the inlet end to facilitate its attachment to a pipe or other receptacle. At its opposite end the casing 10 is internally threaded as indicated at 15 to receive a coupling nut 16. The coupling nut 16 preferably has a reduced outlet extension externally threaded as indicated at 17 to facilitate its connection to a pipe or the like. The nut 16 is formed internally with an outlet bore 18 which may be of the same diameter as the inlet bore 12 and which flares into an enlarged bore 19 for communication with the main valve bore 11.

A valve poppet or needle 20 is reciprocably mounted in the valve bore 11 in any desired manner. In the embodiment shown the poppet includes a guiding portion 21 of substantially triangular shape having three segmental portions 22 slidably bearing in the valve bore 11. The poppet is formed with a small bore 23 and a counterbore 24 opening into the same from its rear face. A triangular spider 25 having arms 26 engaging the interior of the bore 11 is positioned in the valve casing 10 and held against rearward axial movement in any desired manner as by abutting against the forward edge 27 of the nut 16. The spider 25 carries a guiding pin 28 slidably bearing in the bore 23 in the poppet 20. A valve closing spring 29 is disposed in the counterbore 24 engaging the bottom of the counterbore and the front face of the spider 25 so as normally to urge the poppet 20 toward closed position and press the spider 25 against the forward edge 27 of the nut 16.

In the valve shown, the pin 28 sliding in the bore 23 acts as a dash pot to reduce the speed of the opening and closing movements of the valve. If desired, a small hole 30 can be drilled through the guide pin 28, opening into the bore 19, to permit fluid to enter and leave the bore 23. At its forward end the poppet 20 is formed with a conical needle 31 adapted to engage the conical seat 13 in the valve casing 10. Preferably, as illustrated, the angle of the conical needle 31 is equal to the angle of the conical seat 13 so as to provide a relatively long axial engagement between the needle 31 and the conical seat 13 capable of withstanding high pressures and repeated closings without deformation or battering of the engaging surfaces.

The needle 31 is formed externally with a groove 32, preferably rectangular in cross section, in which is disposed a deformable sealing member 33. The sealing member 33 is preferably an O-ring of rubber or any desired synthetic elastomer and is preferably of a size to fit within the groove 32 without substantial deformation. When the groove 32 is rectangular in section and the sealing member 33 substantially circular in section, as illustrated, the sealing member is preferably of a size to contact the bottom and two side walls of the groove with its outer surface projecting slightly through a projection of the conical surface 31. The rear wall 34 of the groove 32 is spaced from the conical seat 13, when the valve is closed, so as to permit back pressure to act freely upon the member 33. The wall 34 may be substantially equal in height to the diameter of the sealing member 33, as illustrated, so as to prevent the sealing member 33 from being forced into an inoperative position by flow of fluid past the needle 31 when the valve is open.

The poppet 20 is normally seated against the conical seat 13 by the pressure of the spring 29. Fluid pressure entering through the inlet bore 12 exceeding the force of the spring 29 moves the valve axially rearward within the casing 10, separating the needle 31 from the conical seat 13 and permitting fluid to flow between the needle 31 and the seat 13, through the spaces 35 between the bearing members 22, through the spaces between the arms 26 of the spider 25 and out through the outlet bore 18. When the inlet pressure drops below the force of the spring 29, or when the fluid tends to flow from the outlet opening 18 to the inlet opening 12, the poppet 20 moves forwardly against the conical seat 13.

When the cone 31 first engages the seat 13 the parts are in the position illustrated in Fig. 4. If the outer surface of the sealing member 33 were exactly tangent to a projection of the cone 31, both the cone 31 and the undeformed sealing member 33 would engage the seat 13 simultaneously. In order to make certain that the sealing member 33 engages the seat, and to take care of necessary manufacturing tolerances, the periphery of the ring 33 is preferably slightly larger than a circle tangent to a projection of the cone 31. Any fluid from the outlet side of the valve tending to leak through the minute spaces which may exist between the cone 31 and the seat 13 deforms the sealing member 33 so as to press it into closer engagement with the seat 13 and positively seal the valve. When the poppet first engages its seat, as shown in Fig. 4, a roughly triangular clearance space 36 remains between the forward edge 37 of the groove 32, the conical seat 13, and the adjacent surface of the sealing member 33. The sealing member 33 may deform into and partially or completely close this space, as shown in Fig. 5, when fluid pressure is applied to the rear face of the sealing member tending to leak past the seat into the inlet opening 12. This deformation of the sealing member increases the area of engagement between the sealing member 33 and the forward edge 37 of the groove 32, and likewise increases the area of engagement between the sealing member 33 and the conical seat 13, thus positively sealing the valve.

In the movement of the poppet 20 towards closed position the deformable member 33 is prevented from being caught and pinched against the seat 13 by the rounded curvature of the outer surface of the member 33 and the relation of the periphery of the member 33 to a projection of the cone 31 which provide the roughly triangular clearance space 36 when the poppet has come into engagement with the seat 13. The deformation of the member 33 after it has contacted the seat 13 and before the cone 31 of the poppet has itself contacted the seat is insufficient to force the material of the member 33 into the spaces between the poppet and the seat. For the same reasons the sealing member 33 cannot be forced by high fluid pressure from the outlet side of the valve into the space between the conical member 31 and the seat 13 as the valve approaches closed position since this force does not act to move the member 33 with respect to the poppet until the closing motion of the poppet has been stopped by contact with the seat.

With the valve fully closed, as illustrated in Fig. 5, it is again opened when the pressure on the forward end of the cone 31 entering through the inlet opening 12 exceeds the sum of the force of the spring 29 and the force of the back pressure in the outlet opening 18. Before the valve opens, when the inlet pressure has increased sufficiently to balance the back pressure in the outlet opening 18, the force tending to hold the sealing member 33 in its deformed position illustrated in Fig. 5 is removed, and the inherent resilience of the sealing member 33 returns it to the position illustrated in Fig. 4. When the inlet pressure has further increased sufficiently to open the valve, the needle 31 moves rearwardly away from the seat 13, permitting the inlet fluid to pass between these surfaces and against and past the sealing member 33. Any adhesion between the sealing member 33 and the seat 13 that may tend to exist is immediately broken when the valve starts to open by the fluid pressure acting against the front face of the sealing member 33 tending to deform or move it rearwardly in the groove 32. Thus the sealing member is prevented from any danger of being caught and pinched between the needle 31 and the seal 13 during the opening movement of the valve. When the valve is open and fluid is flowing from the inlet opening 12 to the outlet opening 18, the sealing member 33 is prevented from being pushed into an inoperative position by engagement with the rear wall 34 of the groove 32.

The form of the invention illustrated in Fig. 6 is the same as that described above, except that the rear wall 134 of the groove 132 is inclined toward the front wall 137 of the groove. The space between the outer edges of the groove walls 134 and 137 is slightly less than the thickness of the sealing ring 133, so that it is necessary to deform the ring 133 in order to push it into position in the groove. With this arrangement the ring is locked in its seat and cannot be pulled out by eddies or low pressure zones which might be created by a high velocity of fluid when the valve is open, or by an arrangement of the fluid passages in the valve creating an excessive pressure drop around the sealing ring.

The form illustrated in Fig. 7 is substantially the same as that shown in Fig. 6, except that the constriction of the mouth of the groove is obtained by a separate member 238 pressed on to the poppet 220 so as to overhang slightly the rear wall 234 of the groove 232. The groove walls 234 and 237 may be radial, as in the form shown in Figs. 1 to 5 inclusive, and the edges of the two groove walls may be of substantially the same diameter. The member 238 is then pressed on to the poppet from its front end.

Although preferred embodiments of the invention have been described in considerable detail it will be understood that many modifications and rearrangements of the parts may be resorted to without departing from the scope of the invention as defined in the following claims.

I claim:

1. A check valve comprising a casing having a fluid inlet passage, a seating surface flaring outwardly from said passage and an outlet passage leading from the large diameter portion of said flared seating surface, a poppet movably mounted within said casing and having a flared surface adapted to engage said seating surface, said poppet being formed with a groove having a substantially radial forward wall, a bottom wall generally parallel to the poppet axis, and a rearward wall, a rubber-like O-ring seal disposed in said groove, said ring being of such dimensions as to engage said flaring casing seating surface just before said two flared surfaces are brought into engagement with each other, there being with said surfaces in engagement a space defined by said forward groove wall, an adjacent portion of said seating surface, and the adjacent rounded portion of said ring that precludes pinching of said ring as said poppet closes, closing of said poppet urging said ring along the bottom groove wall and away from said space, said ring being deformable by fluid pressure into said space to seal the joint between said two surfaces when in engagement.

2. A check valve comprising a casing having a fluid inlet passage, a seating surface flaring outwardly from said passage and an outlet passage leading from the large diameter portion of said flared seating surface, a poppet movably mounted within said casing and having a flared surface adapted to engage said seating surface, said poppet being formed with a groove having a substantially radial forward wall, a bottom wall generally parallel to the poppet axis, and a rearward wall, a rubber-like O-ring seal disposed in said groove, said ring being of such dimensions as to engage said flaring casing seating surface just before said two flared surfaces are brought into engagement with each other, there being with said surfaces in engagement a space defined by said forward groove wall, an adjacent portion of said seating surface, and the adjacent rounded portion of said ring that precludes pinching of said ring as said poppet closes, closing of said poppet urging said ring along the bottom groove wall and away from said space, said ring being deformable by fluid pressure into said space to seal the joint between said two surfaces when in engagement, the periphery of the said poppet at and rearwardly of said rearward groove wall being spaced from said casing so that fluid pressure trapped by said poppet may act on said O-ring to urge the same into said defined space.

LOUIS B. COURTOT.

REFERENCES CITED

The following references are of record in the file of this patent:

UNITED STATES PATENTS

| Number | Name | Date |
| --- | --- | --- |
| 874,652 | Bailey | Dec. 24, 1907 |
| 2,002,672 | Melott | May 28, 1935 |
| 2,083,584 | Wineman | June 15, 1937 |
| 2,300,030 | Zinkil | Oct. 27, 1942 |
| 2,314,683 | Berry | Mar. 23, 1943 |
| 2,417,494 | Hoof | Mar. 18, 1947 |
| 2,427,787 | Hunter | Sept. 23, 1947 |
| 2,431,437 | VanDerWerff | Nov. 25, 1947 |

FOREIGN PATENTS

| Number | Country | Date |
| --- | --- | --- |
| 40,549 | Germany | of 1887 |
| 147,053 | Austria | Sept. 25, 1936 |